(12) United States Patent
Daniels

(10) Patent No.: US 9,464,461 B2
(45) Date of Patent: Oct. 11, 2016

(54) LOCK DEVICE AND METHOD OF USE

(71) Applicant: Ron R. Daniels, Missouri, TX (US)

(72) Inventor: Ron R. Daniels, Missouri, TX (US)

(\*) Notice: Subject to any disclaimer, the term of this patent is extended or adjusted under 35 U.S.C. 154(b) by 293 days.

(21) Appl. No.: 14/013,240

(22) Filed: Aug. 29, 2013

(65) Prior Publication Data
US 2014/0060129 A1 Mar. 6, 2014

Related U.S. Application Data

(60) Provisional application No. 61/695,962, filed on Aug. 31, 2012, provisional application No. 61/753,675, filed on Jan. 17, 2013.

(51) Int. Cl.
| | | |
|---|---|---|
| *B25G 3/20* | (2006.01) | |
| *E05B 63/00* | (2006.01) | |
| *E05B 35/00* | (2006.01) | |
| *E05B 67/36* | (2006.01) | |
| *F41A 17/44* | (2006.01) | |
| *F16B 2/14* | (2006.01) | |
| *F16B 23/00* | (2006.01) | |
| *B62H 5/06* | (2006.01) | |

(52) U.S. Cl.
CPC ............ *E05B 63/00* (2013.01); *E05B 35/008* (2013.01); *E05B 67/36* (2013.01); *E05B 67/365* (2013.01); *F41A 17/44* (2013.01); *B62H 5/06* (2013.01); *F16B 2/14* (2013.01); *F16B 23/0007* (2013.01); *Y10T 70/7486* (2015.04)

(58) Field of Classification Search
CPC ........ B62H 5/06; E05B 35/008; E05B 63/00
See application file for complete search history.

(56) References Cited

U.S. PATENT DOCUMENTS

| | | | | |
|---|---|---|---|---|
| 1,560,489 | A * | 11/1925 | Yager | E05C 9/046 138/89 |
| 1,926,798 | A * | 9/1933 | Baumbach | F16B 2/16 279/2.12 |
| 4,828,035 | A * | 5/1989 | McInturff | 166/339 |
| 9,004,836 | B2 * | 4/2015 | Wells et al. | 411/402 |
| 2006/0058789 | A1 * | 3/2006 | Kim et al. | 606/61 |

\* cited by examiner

*Primary Examiner* — Kristina Fulton
*Assistant Examiner* — Thomas Neubauer
(74) *Attorney, Agent, or Firm* — Ira P. Domnitz

(57) ABSTRACT

The present invention, and inventive system, describes a locking system that reinforces an existing recessed cover or tubular. In many embodiments of the present invention, the present invention reinforces an existing recessed cover by preventing the recessed covers from being easily removed by unauthorized persons and prevents any unauthorized personnel from accessing a locked down tubular. In one embodiment of the present invention, the inventive system is designed to maximize the overall strength of the locking unit for recessed covers or tubulars by using applied force on both the recessed cover and the circumference, curves, or straight, edge of the recessed unit or tubular interior.

4 Claims, 3 Drawing Sheets

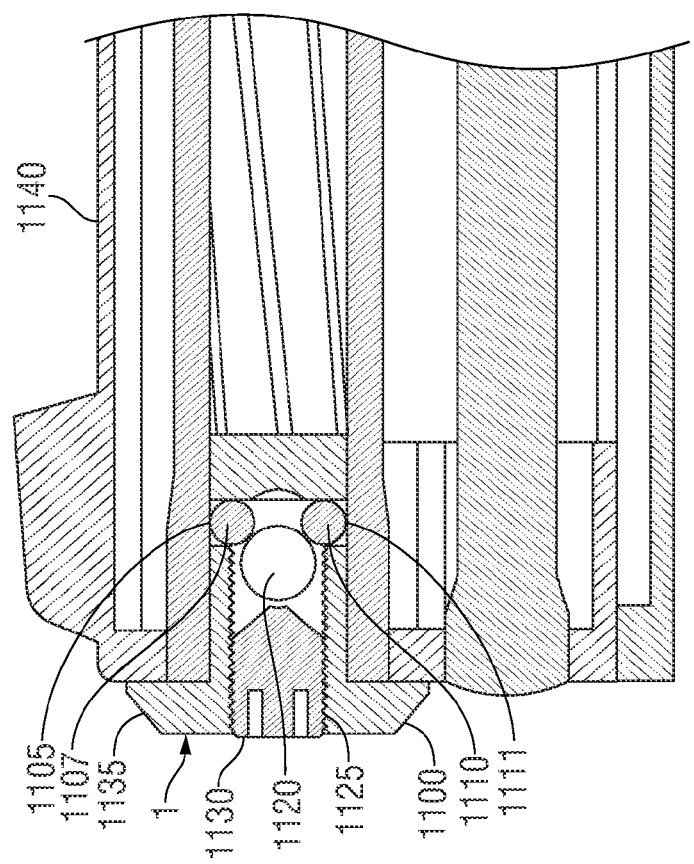
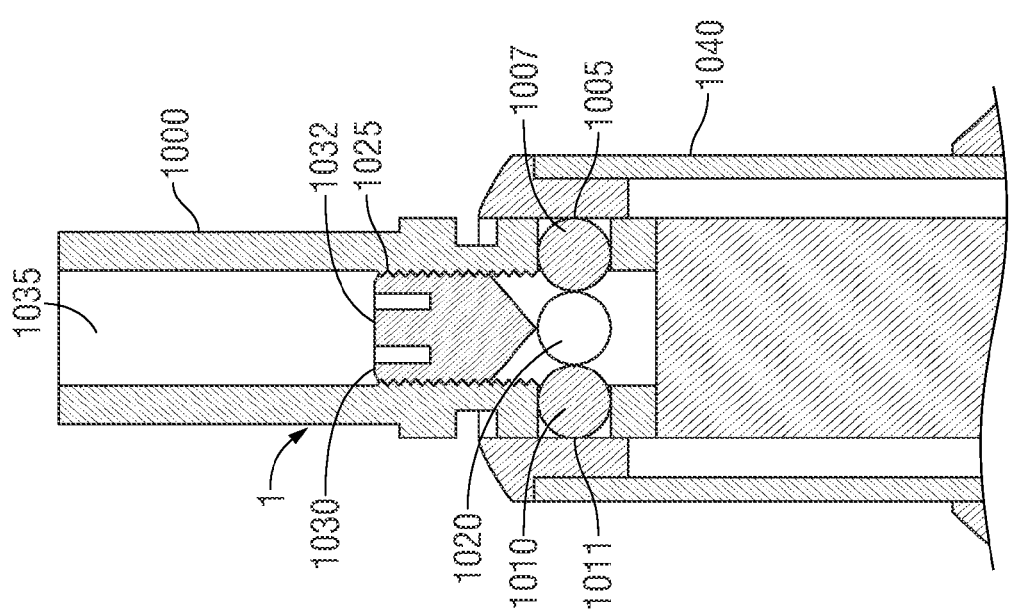

LOCK DEVICE AND METHOD OF USE

CROSS-REFERENCE TO RELATED APPLICATIONS

This application claims priority to U.S. Provisional patent application 61/695,962, filed Aug. 31, 2012, and to U.S. Provisional patent application 61/753,657, filed Jan. 17, 2013, which are incorporated by reference herein in their entirety.

STATEMENT REGARDING FEDERALLY SPONSORED RESEARCH

Not applicable

BACKGROUND

The present invention, and inventive system, is a new and novel locking mechanism that prevents entry to recessed covers, and tubular openings, which can include a manhole cover, doors with frames, gun barrels, bicycle steering wheel columns, or other recessed covers or tubulars. Commonly, such items can be seen in public as manhole covers, hatches, or door frames, bike steering columns, pipeline locks, locking nuts, and gun barrels although, it is envisioned that other recessed covers and tubulars could be locked with the present inventive device regardless of shape or size. In one embodiment of the present invention, the present invention is installed and works in conjunction with an existing circular recessed cover, such as, manhole covers to prevent theft of circular recessed cover by securing the cover the cover's ring, or frame, in another embodiment of the present invention, the present invention can prevent unauthorized access into circular, rounded, square, and trapezoidal or any other shaped recessed units or covers, such as, and by way of example a manhole, underground units, doors with door frames, or pipeline locks. In another embodiment of the present invention, the present invention can prevent unauthorized access to a gun, by locking down a gun barrel. In another embodiment of the present invention, the present invention can prevent unauthorized access to a bicycle steering column by removal of the handle bars and having the user lock down the steering column.

In one embodiment of the present invention, the present invention works by inserting locking units into open slots on a recessed cover, or in the tubular opening and engaging the locking units. In one embodiment of the present invention, this is done by tightening down on screw head preferably located in the locking unit. In one embodiment of the present invention, the locking unit then prevents the removal of a recessed cover from the recessed unit, by way of example, a manhole unit, door frame or ring, and thus not allowing entry into the recessed unit.

SUMMARY

In various embodiments, the present invention describes a system that reinforces an existing recessed cover. By way of example, in some embodiments, the present invention could be a manhole cover, a door with a door frame, a cabinet lock, pipeline lock, bike lock, gun lock, car door lock, a bicycle steering column, any other recessed cover that can have, or has, an open slot adjacent to the frame edge or has an opening in a tubular cylinder. In many embodiments of the present invention, the present invention reinforces an existing recessed cover by preventing the recessed covers from being easily removed by unauthorized persons. In one embodiment of the present invention, the inventive system is designed to maximize the overall strength of the locking unit for recessed covers by using applied force on both the recessed cover and the circumference, curves, or straight, edge of the recessed frame or ring. In another embodiment of the present invention the present locking device locks on the top of a tubular therein preventing and movement or use of the tubular and preventing any materials from moving through the tubular.

In one embodiment of the present invention, a locking unit is placed into an existing recessed cover, by way of example, a manhole cover, into the open slots of the recessed cover. In one embodiment of the present invention, the locking unit works on any recessed covers that have slots already precast into them, although in various embodiments of the present invention the slots on the recessed cover may be machined or manufactured just prior to the insertion of the present inventive device, by the removal of sonic materials on the recessed cover that engages the engaging frame in order to machine the slot. In many embodiments of the present invention, it is preferable, that once locked in place the locking unit can provide increased security of the recessed unit, such as, manholes by preventing the removal of the cover from the cover ring, or other engaging frame.

In one embodiment of the present invention, a locking unit is placed into an existing tubular, by way of example, gun barrel or a bicycle steering column, into the top of the open tubular. The present inventive device is then engaged with the tubular walls therein preventing the tubular from being utilized to have other objects pass through it.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 5 illustrates an embodiment of the present invention in a cross-sectional view being utilized in a bicycle steering column; and FIG. 6 illustrates an embodiment of the present invention in a cross-sectional view being utilized in a gun barrel.

DETAILED DESCRIPTION

Figure 1:
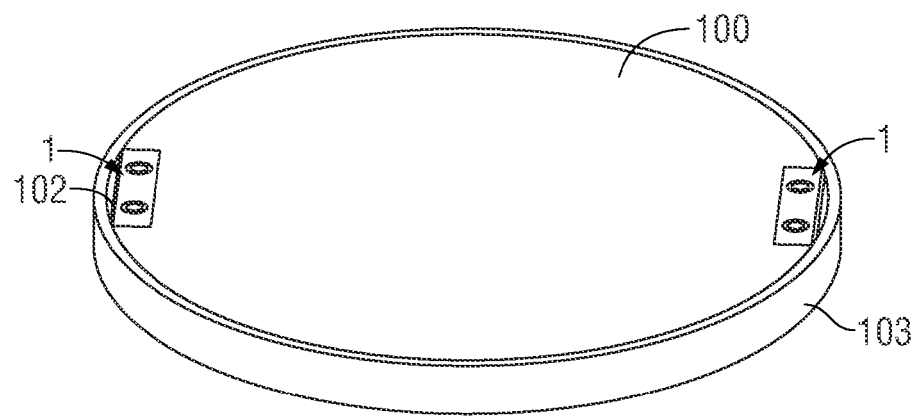
FIG. 1 illustrates one embodiment of the recessed cover and recessed unit cover ring with the inventive device inserted into it.

In the following description, certain details are set forth such as specific quantities, sizes, etc . . . so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. "Manhole cover" as defined in the present disclosure refers to any covering for an underground access tunnel to be used by humans. "Ring" as defined in the present disclosure refers to any frame for a recessed cover, regardless of shape. "Tubular" as defined herein includes any object with solid exterior walls and a hollow interior with an opening. "Pin spike" as defined herein includes any object with solid three dimensional shape, which maybe spike shaped, spherical or other three dimensional shape. "Pin spike backing" as defined herein includes any object with solid three dimensional shape, which maybe spike shaped, spherical, cylindrical or other three dimensional shape.

One or more illustrative embodiments incorporating the invention disclosed herein are presented below. Applicants have created a revolutionary, and novel security system for recessed covers with frames, as well as tubulars.

As shown in FIG. 1, one embodiment of the present inventive lock system 1 may be used in conjunction with an existing recessed cover 100, by way of example and for illustrative purposes only, a circular ground cover, or manhole. In several other embodiments of the present lock system 1, the present invention does not need to have a recessed cover that is a manhole, but can be used with any recessed cover, regardless of shape or size. In one embodiment of the present invention, the recessed cover 100 has open slots 102 on the circumference of the recessed cover 100. In some embodiments of the present invention the open slots 102 are precast into the recessed cover 100, in other embodiments of the present invention the open slots 102 can be formed by removal of circumferential sections of the recessed cover 100. In some embodiments of the present invention, there are more than one open slots 102 on the recessed cover 100, in other embodiments, only one open slot 102 is needed. In several embodiments of the present invention, the recessed cover 100 may be constructed of iron, wood, steel, plastics, or other materials utilized to provide a cover barrier that can withstand at least 1,000 lbs. of applied pressure in trying to remove the recessed cover 100 from the cover ring 103. In several embodiments of the present invention, the recessed cover 100 maybe square, round, trapezoidal or any other geometric shape. In several embodiments of the present invention, the open slots 102 maybe square, round, trapezoidal or any other geometric shape.

As shown in FIG. 1, the present invention comprises a lock system 1 that is sizable enough to fit into the open slots 102 of the recessed cover 100. In some embodiments of the present invention, the recessed cover 100 will sit flush and at the same horizontal plane with the cover ring 103. In alternate embodiments the recessed cover 100 may be raised, or lower, than the cover ring 103. In several embodiments of the present invention the cover ring 103 has a ledge upon which the recessed cover 100 sits when the recessed cover 100 engages the cover ring 103. In several embodiments of the present invention, the recessed cover ring 103 may be constructed of iron, wood, steel, plastics, or other materials utilized to provide a setting ring for a cover barrier. In several embodiments of the present invention, the recessed cover ring 103 maybe square, round trapezoidal or any other geometric shape designed to engage the recessed cover 100.

Figure 2:
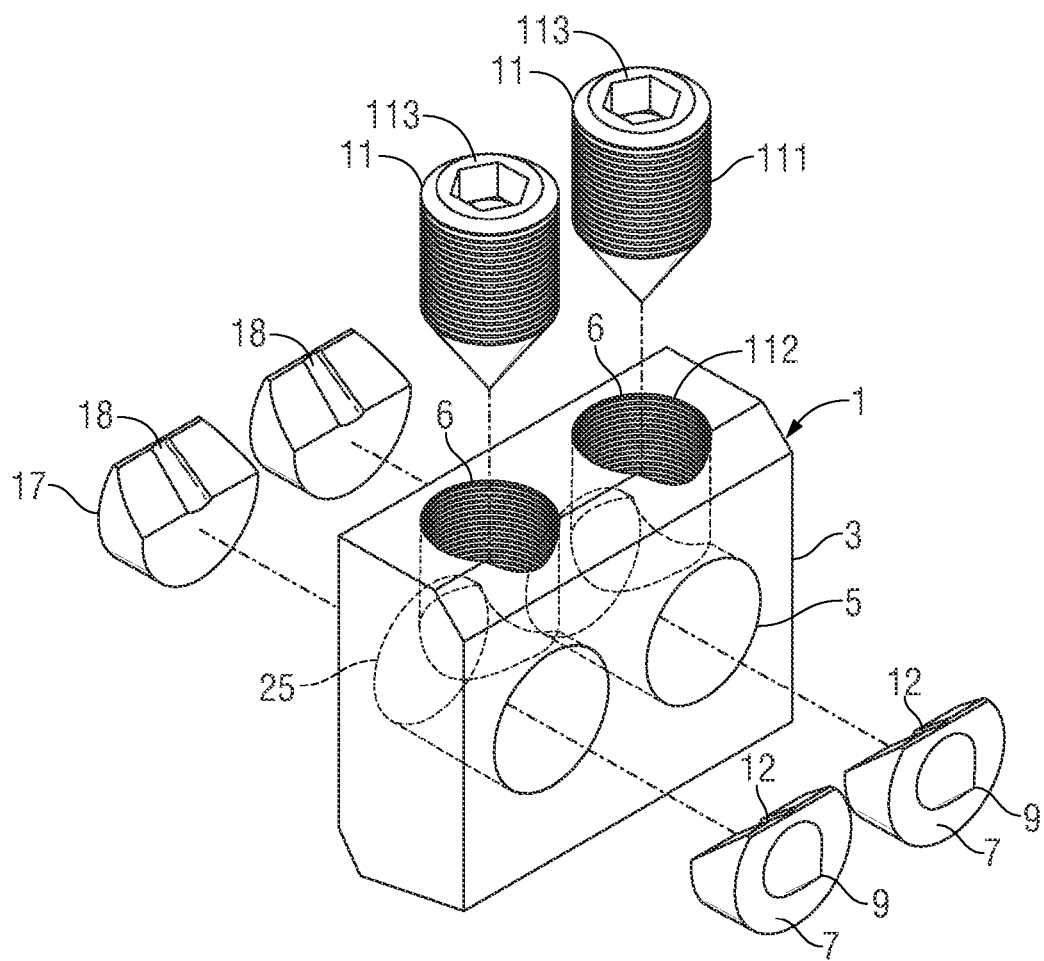
FIG. 2 illustrates one embodiment of the present device in an exploded view.

FIG. 2 illustrates one embodiment of the present invention, or lock system 1, in exploded form. As illustrated, in one embodiment of the present invention, the invention has a cuboid. rectangular base 3, although other three dimensional geometric shapes can be used in the present invention, including cubes, spheres, cones, cylinders or other three dimensional shapes. As illustrated, rectangular base 3 is preferably hollow, and preferably constructed to have two sets of three openings: the upper openings 6, the pin spike openings 5 and the pin back openings 25. In several embodiments of the present invention, the base 3 may be constructed of iron, steel, plastics, or other materials utilized to provide a solid locking mechanism for a locking system 1. In many embodiments of the present invention the base 3 can be constructed of variable sizes such that it will fit into open slots 102 on the recessed cover 100. In several embodiments of the present invention there is only need for one upper opening 6, pin spike opening 5 and the pin back opening 25, rather than the two as illustrated.

FIG. 2 also illustrates the pin spike backings 17, which in several preferred embodiments of the present invention, enter into the base 3 through pin back openings 25. In several embodiments of the present invention, pin spike backings 17 may be constructed of iron, steel, plastics, or other materials utilized to provide a solid locking mechanism for a locking system 1. In many embodiments of the present invention the pin spike backings 17 can be constructed of variable sizes such that they will fit into pin back openings 25 on base 3. As illustrated, in several preferred embodiments of the present invention, the pin spike backings 17 are constructed to have a groove 18 which faces the upper openings 6 when the lock system 1 is fully assembled. In several embodiments of the present invention there is only need for one pin set backing 17, rather than the two as illustrated.

Figure 3:
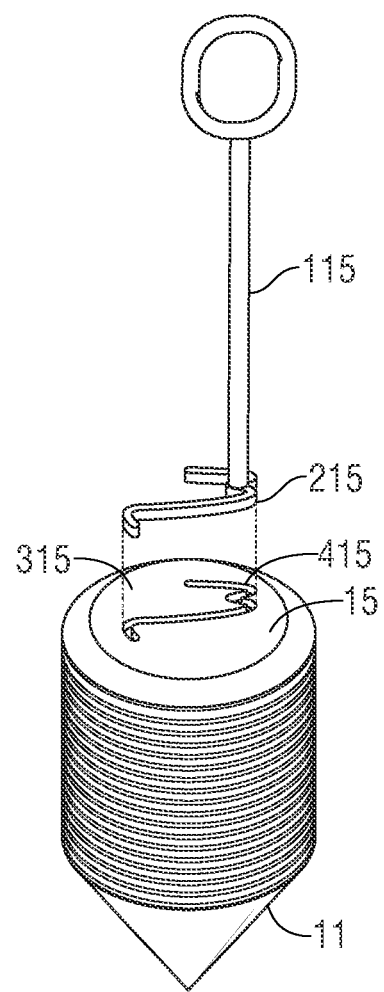
FIG. 3 illustrates one embodiment of the proprietary locking screw and key of the present invention.

FIG. 2 also illustrates the locking screws 11, which in several embodiments of the present invention, enter in the base 3 through the upper openings 6. In several embodiments of the present invention there is only need for one locking screw 11, rather than the two as illustrated. In several embodiments of the present invention, the locking screws 11 may be constructed of iron, steel, plastics, or other materials utilized to provide a solid locking system 1 for a recessed cover 100. In many embodiments of the present invention the locking screws 11 can be constructed of variable sizes such that they will in into upper openings 6. As illustrated, in several preferred embodiments of the present invention, the locking screws 11 are constructed to have threads 111 on the outer edges which can engage the counter threads 112 that are located, in several embodiments of the present invention, in the upper openings 6 in a manner known in the art for threading engagement. Also illustrated in the FIG. 2, is the engagement face 113 of the locking screws 11 which maybe of a standard Allen wrench design, or have a proprietary engagement face 315 so as to engage with only a corresponding proprietary key 115, as shown in FIG. 3. Many embodiments of the present invention, only one locking screw 11 is necessary.

FIG. 2 also illustrates the pin spikes 7, which in several embodiments of the lock system 1, are inserted into the base 3 through the pin spike openings 5. In several embodiments of the present invention there is only need for one pin spike 7, rather than the two as illustrated, in several embodiments of the present invention, the pin spikes 7 may be constructed of iron, steel, plastics, or other materials utilized to provide a solid lock system 1 for a recessed cover 100. In many embodiments of the present invention the pin spikes 7 can be constructed of variable sizes such that they will fit into the pin spike openings 5. As illustrated, in several preferred embodiments of the present invention, the pin spike 7 are constructed to have an external spike 9 which can engage the recessed cover 100 when in the lock system 1 is engaged. In several embodiments of the present invention, external spike 9 may be constructed of iron, steel, plastics, or other materials utilized to provide a solid lock system 1 for a cover barrier. The external spike 9 may also be constructed of different materials than the pin spike 7. Also illustrated in the FIG. 2, is the groove 18 and the recessed portion 12 of the pin spike 7 which maybe slotted and slanted toward the pin spike opening 5 and may have a slotted engagement face, or any other geometric face so as to engage the locking screws 11 when the present lock system 1 is in operation. In many embodiments of the present invention, only one pin spike 7 is necessary.

FIG. 3 illustrates one embodiment of the locking screw 11 and key 115. As illustrated in this embodiment, the locking screw 11 has a proprietary shaped cover 15 with an orifice 415. Orifice 415 can be of any geometric shape or design. Also illustrated is the key 115 with a male engaging member 215 which is preferably corresponding shaped to mechanically and releasably engage the orifice 415 such that the locking screw 11 may be rotated when the present lock system 1 is engaged. In one embodiment of the present inventive device, in operation this would mean that only persons with the proper tool could engage the locking screw 11. As the illustrated in FIG. 5, orifice 415 is a stylized "ML" shape, however, any geometric proprietary shape for the orifice 415 can be utilized.

Figure 4:
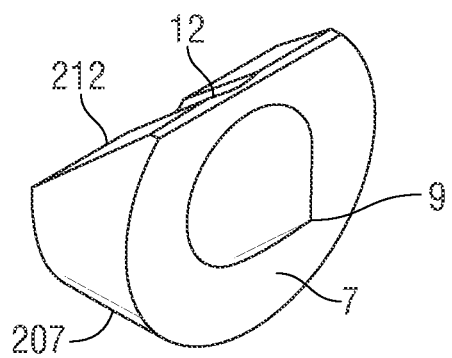
FIG. 4 illustrates an embodiment of the pin spikes of the present invention.

FIG. 4 illustrates one embodiment of the pin spikes 7. As illustrated, in one embodiment of the present invention, the pin spike 7 can be constructed with a semi-cylindrical spike base 207, however, there may be other embodiments of the present invention in which the spike base 207 is beveled, square or other three dimensional geometric shape. Further illustrated, is the external spike 9, which may be fashioned in a spike, cylindrical, cube, spherical, or other three dimensional shape. FIG. 4 also illustrates the recessed portion 12 of the pin spike 7 on the screw engagement face 212. The screw engagement face 212 is preferably constructed with a downward slope away from the external spike 9, but may be constructed in other manners which will allow it to engage the locking screws 11 and push distal from the base 3 when the present lock system 1 is engaged. Recessed portion 12, may be constructed to form a slot, orifice, gap, or other area that will allow for the locking screws 11 to drive down and push the pin spikes 7 distal from the base 3 when the present inventive device is engaged.

FIG. 5 illustrates a cross section of one embodiment of the present locking system 1 as utilized on a bicycle steering column 1040. As illustrated in this embodiment, the bicycle handlebar has been previously removed so that the base 1000, in this case, cylindrical shaped, is inserted in the bicycle steering column 1040. As shown, the locking screw 1030 is actually recessed in to the base 1000 and also has a proprietary male member 1032 for engagement in order to move the locking screw 1030. Also illustrated are the locking threads 1025 in the upper portion 1035 of the base 1030. As illustrated, in this embodiment of the present invention, the pin spike backing 1010 is of spherical shape and the pin spike 1005 is also of spherical shape, these are yet additional embodiments of elements of the present invention. As illustrated, in this embodiment of the present invention, the pin spike opening 1007 is of a smaller circumference than the pin spike 1005, just as is the pin back opening 1011 of the pin backing 1010. The smaller circumference prevents the pin spike 1005 and the pin backing 1010 from disengaging from the base 1000, when the present inventive device is removed from the steering column 1040. Also illustrated, is the pressure sphere 1020, which in this embodiment of the present locking device 1, can he placed between the locking screw 1030 and the pin spike 1005 and the pin spike backing 1010. In this embodiment of the locking system 1, the pressure sphere 1020 acts to evenly press the pin spike 1005 and the pin backing 1010 into place when the locking system 1 is engaged. In several embodiments of the present invention, the base, 1000, the locking screw 1030, the pin spike 1005, the pin spike backing 1010, and/or the pressure sphere 1020 may all be constructed of iron, steel, plastics, or other materials utilized, or combinations of these materials, in order to provide a solid lock system 1. In several embodiments of the present invention, the base, 1000, the locking screw 1030, the pin spike 1005, the pin spike backing 1010, and/or the pressure sphere 1020 may all be constructed of variable size and shape so as to be utilized in the present locking system 1 for maximum effect.

FIG. 6 illustrates a cross section of one embodiment of the present locking system 1 as utilized on a gun barrel 1140. As illustrated in this embodiment, the base 1100, in this case, cylindrical shaped, is inserted into a gun barrel 1140. As shown, the locking screw 1130 is actually elevated in relation to the base 1100. Also illustrated are the locking threads 1125 in the upper portion 1135 of the base 1100. As illustrated, in this embodiment of the present invention, the pin spike backing 1110 is of spherical shape and the pin spike 1105 is also of spherical shape. As illustrated the pin spike opening 1107 if of a smaller circumference than the pin spike 1105 as is the pin back opening 1111 of the pin backing 1110. The smaller circumference prevents the pin spike 1105 and the pin backing 1110 from disengaging from the base 1100. Also illustrated, is the pressure sphere 1120, which in this embodiment of the present locking device 1, can be placed between the locking screw 1130 and the pin spike 1105 and the pin spike backing 1110. In this embodiment of the locking system 1, the pressure sphere 1120 acts to evenly press the pin spike 1105 and the pin backing 1110 into place when the locking system 1 is engaged. In several embodiments of the present invention, the base, 1100. the locking screw 1130, the pin spike 1105, the pin spike hacking 1110, and/or the pressure sphere 1120 may all be constructed of iron, steel, plastics, or other materials utilized, or combinations of these materials, in order to provide a solid lock system 1. In several embodiments of the present invention, the base, 1100, the locking screw 1130, the pin spike 1105, the pin spike hacking 1110, and/or the pressure sphere 1120 may all be constructed of variable size and shape so as to be utilized in the present locking system 1 for maximum effect.

In one embodiment of the present inventive device, the present inventive device is installed as follows, One embodiment of the present invention may be placed into the open slots 102 on a recessed cover 100. In some embodiments of the present invention, on one open slot 02 need be present on the recessed cover 100, in some embodiments of the present invention, there are more than one open slots 102 on the recessed cover 100, and therefore multiple lock systems 1 may be used on the recessed cover 100. It is preferable, that the present invention is placed such that the pin spike backings 17 are adjacent to the cover ring 103, the pin spikes are adjacent to the recessed cover 100 and the locking screws are facing away from the bottom edge of the cover ring 103, when installing the lock system 1. To engage the present inventive device, the user need to insert the key 115 into the cover engagement face 15 and rotate the key 115 in relation to the locking screws 11 therein causing the locking screws 11 to rotate and push downward on the recessed portion 12. In several embodiments of the present invention, the locking screw 11, when rotated, will push in the space between the pin, spike backings 17 and the pin spikes 7 causing them to move distal to each other, ergo, wedging them apart. In some embodiments of the present invention, when the recessed portion 12 is pushed downward, the pin spike 7 will push distal to the base 3 and cause the external spike 9 to engage the recessed cover 100 thereby preventing is from being moved in relation to the cover ring 103.

In order to disengage the present inventive device the key 115 is reinserted into the cover engagement face 15 and counter-rotated thereby causing the locking screws 11 to counter-rotate upwards which allows the pin spike 7, and the spike to retract into the base 3 and disengage from the recessed cover 100.

In one embodiment of the present inventive device, the present inventive device is installed as follows. One embodiment of the present invention may be placed into the open tubular, such as a bicycle steering column or a gun barrel (FIGS. 5 and 6). To engage the present inventive device, the user need to rotate the locking screw 1030 or 1130 respectively therein causing the locking screw 1030 or 1130 respectively to rotate and push downward on the pressure sphere 1020 or 1120 respectively. In several embodiments of the present invention, the locking screw 1030 or 1130 respectively, when rotated, will push on the pressure sphere 1020 or 1120 respectively and cause the spike backings 1010 or 1110 respectively and the pin spikes 1005 or 1105 respectively to move distal to each other, ergo, wedging them apart and lock down the tubular thereby preventing any objects from entering or exiting the tubular.

In order to disengage the present inventive device the locking screw 1030 or 1130 respectfully is counter-rotated thereby causing the locking screws 1030 or 1130 respectively to counter-rotate upwards which allows the pressure sphere 1020 or 1120 respectively to retract and cause the spike backings 1010 or 1110 respectively and the pin spikes 1005 or 1105 respectively to move retract.

As illustrated in FIG. 2, in one embodiment of the present invention, the present invention is assembled in the following manner. In one embodiment, the invention has a cuboid base 3, although other geometric shapes can he used in the present invention, including cubes, spheres, cones, cylinders or other solid shapes, into which there are preferably sets of three openings the upper openings 6, the pin spike openings 5 and the pin back openings 25. The pin spike backings 17 are preferably inserted into to the pin back openings 25. In some embodiments of the present invention, the pin back openings 25 are pinched or mechanically squeezed to make a smaller circumference after the pin spike backings 17 are inserted, this prevents the pin spike backings 17 from falling out of the base 3, when the base is removed. The pin spikes 7 are preferably inserting in to the pin spike backings 5. This can be done at the same time or at different junctures. The pin spikes 7 are preferably inserted with the recessed portion 12 facing the upper openings 6. At this point the locking screws 11 maybe loosely threaded into the upper opening 6. The present inventive device can then be fit into open slots 102 of the recessed cover 100 and engaged.

As illustrated in FIGS. 5 and 6, the inventive device is assembled mach the same way as illustrated in FIG. 2, but with the additional step of prior to inserting a locking screw 1030 or 1130 respectively a pressure sphere 1020 or 1120 respectively is inserted into the space between the backings 1010 or 1110 respectively and the pin spikes 1005 or 1105 respectively and the locking, screw 1030 or 1130.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is the following:

1. A locking system to lock a first member to a second member, comprising:
   a hollowed three dimensional cuboid base mounted on a first member, the base includes a hole in a top region and first hole in a side region adjacent to the top region;
   a pin spike which is releasably inserted into said first hole of said cuboid base; said pin spike defining a body, an external spike protruding from said body and a recessed portion defining a groove distal to said external spike;
   a locking screw which can be inserted into the hole in the top region of said base; and
   wherein said locking screw mechanically engages with said pin spike through mechanical communication with said groove such that when rotated, said locking screw moves in relation to said groove, causing the pin spike to extend from said base, allowing said external spike to lock against the second member and secure the first member with respect to the second member.

2. The improved locking system claim 1 further comprising;
   said base comprises an additional second hole in a second side region facing opposite side of said base said first hole in the side region but adjacent to the top region;
   a pin backing which is inserted into said second hole.

3. The improved locking system of claim 1 further comprising;
   said hole in top region is threaded; and
   said locking screw is threaded to mechanically engage with said hole in top region.

4. The improved locking system of claim 1 further comprising;
   a key with a male interlace in a unique geometric configuration;
   said locking screw further comprises
   a cover for said locking screw;
   said cover further comprising:
   a female interface with a unique geometric configuration designed to interface with said key.

* * * * *